United States Patent
Toshihiro et al.

(10) Patent No.: US 7,613,339 B2
(45) Date of Patent: *Nov. 3, 2009

(54) METHOD AND AN APPARATUS FOR DETECTING THE BASE CONCENTRATION OF A PHOTOGRAPHIC FILM

(75) Inventors: Shunsaku Toshihiro, Wakayama Prefecture (JP); Koji Kita, Wakayama Prefecture (JP)

(73) Assignee: Noritsu Koki Co., Ltd., Wakayama (JP)

( * ) Notice: Subject to any disclaimer, the term of this patent is extended or adjusted under 35 U.S.C. 154(b) by 646 days.

This patent is subject to a terminal disclaimer.

(21) Appl. No.: 11/285,318

(22) Filed: Nov. 23, 2005

(65) Prior Publication Data

US 2006/0110032 A1    May 25, 2006

(30) Foreign Application Priority Data

Nov. 24, 2004    (JP) .............................. 2004-338729

(51) Int. Cl.
*G06K 9/00* (2006.01)
(52) U.S. Cl. ...................................... 382/162; 382/168
(58) Field of Classification Search ................. 382/167, 382/168, 162, 163; 358/98, 80
See application file for complete search history.

(56) References Cited

U.S. PATENT DOCUMENTS

| | | | | |
|---|---|---|---|---|
| 4,805,016 | A * | 2/1989 | Kato ............................ | 348/71 |
| 5,014,123 | A * | 5/1991 | Imoto ......................... | 358/506 |
| 5,265,200 | A * | 11/1993 | Edgar .......................... | 345/589 |
| 5,278,641 | A * | 1/1994 | Sekizawa et al. ............ | 358/527 |
| 5,502,776 | A * | 3/1996 | Manabe ...................... | 382/172 |
| 5,972,726 | A * | 10/1999 | Saitoh et al. ................. | 438/14 |
| 6,204,940 | B1 * | 3/2001 | Lin et al. ..................... | 358/527 |
| 6,775,408 | B1 * | 8/2004 | Masaki ........................ | 382/167 |
| 7,466,857 | B2 * | 12/2008 | Nishi et al. .................. | 382/167 |

(Continued)

FOREIGN PATENT DOCUMENTS

JP    9-34024 A    2/1997

(Continued)

OTHER PUBLICATIONS

Bor-Tow Chen,"Automatic Histogram Specification Based on Fuzzy Set Operations for Image Enhancement", IEEE Signal Processing Letters, vol. 2. No. 2, Feb. 1995, pp. 37-40.*

*Primary Examiner*—Samir A. Ahmed
*Assistant Examiner*—Mekonen Bekele
(74) *Attorney, Agent, or Firm*—Smith Patent Office (57) ABSTRACT

A method of detecting the base concentration of a film comprises the steps of generating a concentration histogram from the film image in each of the RGB color components, shifting and stretching the histograms in the other colors towards the histogram in the reference color in the concentration axial direction, calculating an superimposed area between the two histograms in the two color components after the stretching process, and finding the shift rate and the stretch ratio when a total of the respective superimposed areas calculated is the greatest value. As the minimum of the lowest concentration in the histograms at the shift rate and the stretch ratio determined is specified to represent the location of the base concentration in the original histogram, the base concentration in each color component of the film can be calculated from the location of the base concentration in the histogram.

4 Claims, 7 Drawing Sheets

U.S. PATENT DOCUMENTS

| | | | |
|---|---|---|---|
| 2002/0171852 A1* | 11/2002 | Zhang et al. | 358/1.9 |
| 2004/0190789 A1* | 9/2004 | Liu et al. | 382/274 |
| 2006/0110033 A1* | 5/2006 | Toshihiro | 382/162 |
| 2006/0133668 A1* | 6/2006 | Kita et al. | 382/162 |

FOREIGN PATENT DOCUMENTS

| | | |
|---|---|---|
| JP | 10-186541 A | 7/1998 |

* cited by examiner

METHOD AND AN APPARATUS FOR DETECTING THE BASE CONCENTRATION OF A PHOTOGRAPHIC FILM

BACKGROUND OF THE INVENTION

1. Field of the Invention

The present invention relates to a method and an apparatus for detecting the base concentration of a photographic film, such as a negative film, read out with a film scanner.

2. Description of the Related Art

It is essential for printing color images recorded on a negative film onto a sheet of photosensitive with higher quality of colors, photographic printing paper to absorb and eliminate any changes in the concentration, which are caused by a difference between scanners or the effect of deterioration with time, from the color image data read out from the film with a film scanner which also depends on the intrinsic characteristics of its input and output systems. For the purpose, the base concentration value of the film is measured and subtracted from the color image data. For example, the base concentration value in both the R (red) and B (blue) colors are adjusted to be equal to the base concentration value in the G (green) color. There have hence been developed some methods for calculating the base concentration value from the concentration in transparent area of a film which include the intervals between frames and the upper and lower margins, such as disclosed in Japanese Unexamined Patent Publication No. 1997-34024 and 1998-186541.

However, none of the conventional methods for determining the base concentration from the concentration in the intervals between frames and in the upper and lower margins are successful to detect the concentration at a desired accuracy in case that the intervals between frames are scarcely provided or a difference in the concentration between over-scenes is highly significant.

SUMMARY OF THE INVENTION

It is hence an object of the present invention, in view of the above described drawback, to provide a method and an apparatus for detecting the base concentration of a film at substantially a desired accuracy even when the intervals between frames are scarcely provided or a difference in the concentration between over-scenes is highly significant.

In order to achieve the above-mentioned object, a method for detecting the base concentration of a film according to the present invention includes a film image entering process for reading a film image by an image pickup device and generating color image data, a concentration histogram generating process for generating concentration histograms for each of RGB color components from the color image data, a shift processing process for shifting concentration histograms of other colors in the concentration axial direction, respectively, with a concentration histogram of a specific color used as a reference, a stretch-processing process for stretching the concentration histograms of other colors in the concentration axial direction with the minimum concentration value used as a reference after shift processing, a superimposed area calculating process for calculating superimposed area of the concentration histogram, respectively, by combinations of two color components after stretch-processing, a discriminating process for finding the shift rate and the stretch ratio when a total of the respective superimposed areas calculated is the greatest value, and a base concentration calculating process of specifying the location of a base concentration from the minimum of the lowest concentration in the concentration histograms at the shift rate and the stretch ratio determined in the discriminating process, determining the location of the base concentration of each color component in the original histogram from the shift rate and the stretch ratio, and calculating the base concentration value in each component of the film from the location of the base concentration.

The shift processing may preferably be arranged to have the maximum of the shift rate limited to a deviation of the lowest of the concentration value in the histogram in each color component from the minimum of the lowest concentrations in the histograms in the color components and shift the histogram in each color towards the minimum.

Also, an apparatus for detecting the base concentration of a film according to the present invention which materializes the above-mentioned method for detecting the base concentration of a film includes a film image entering unit for entering a film image by reading a film image by an image pickup device and generating color image data, a concentration histogram generating unit for generating concentration histograms for each of RGB color components from the color image data, a shift processing unit for shifting concentration histograms of other colors in the concentration axial direction, respectively, with a concentration histogram of a specific color used as a reference, a stretch-processing unit for stretching the concentration histograms of other colors in the concentration axial direction with the minimum concentration value used as a reference after shift processing, a superimposed area calculating unit for calculating superimposed area, respectively, by combinations of two color components after stretch-processing, an discriminating unit for determining the shift and the stretch ratio when a total of the overlapping areas is the greatest value, and a base concentration calculating unit for specifying the location of a base concentration from the minimum of the lowest concentration in the concentration histograms at the shift rate and the stretch ratio determined by the discriminating unit, determining the location of the base concentration of each color in the original histogram from the shift rate and the stretch ratio, and calculating the base concentration value in each component of the film from the location of the base concentration.

As set forth above, the present invention provides the method and the apparatus for detecting the base concentration value of a film where the base concentration can be calculated at substantially a desired accuracy even when the intervals between frames are scarcely provided or a difference in the concentration between over-scenes is highly significant.

The other features of the present invention will be apparent from the following detailed description of the preferred embodiments.

DESCRIPTION OF THE PREFERRED EMBODIMENTS

Referring now to the drawings, a method of detecting the base concentration of a film and an apparatus using the method will be described in detail hereinafter.

Figure 1:
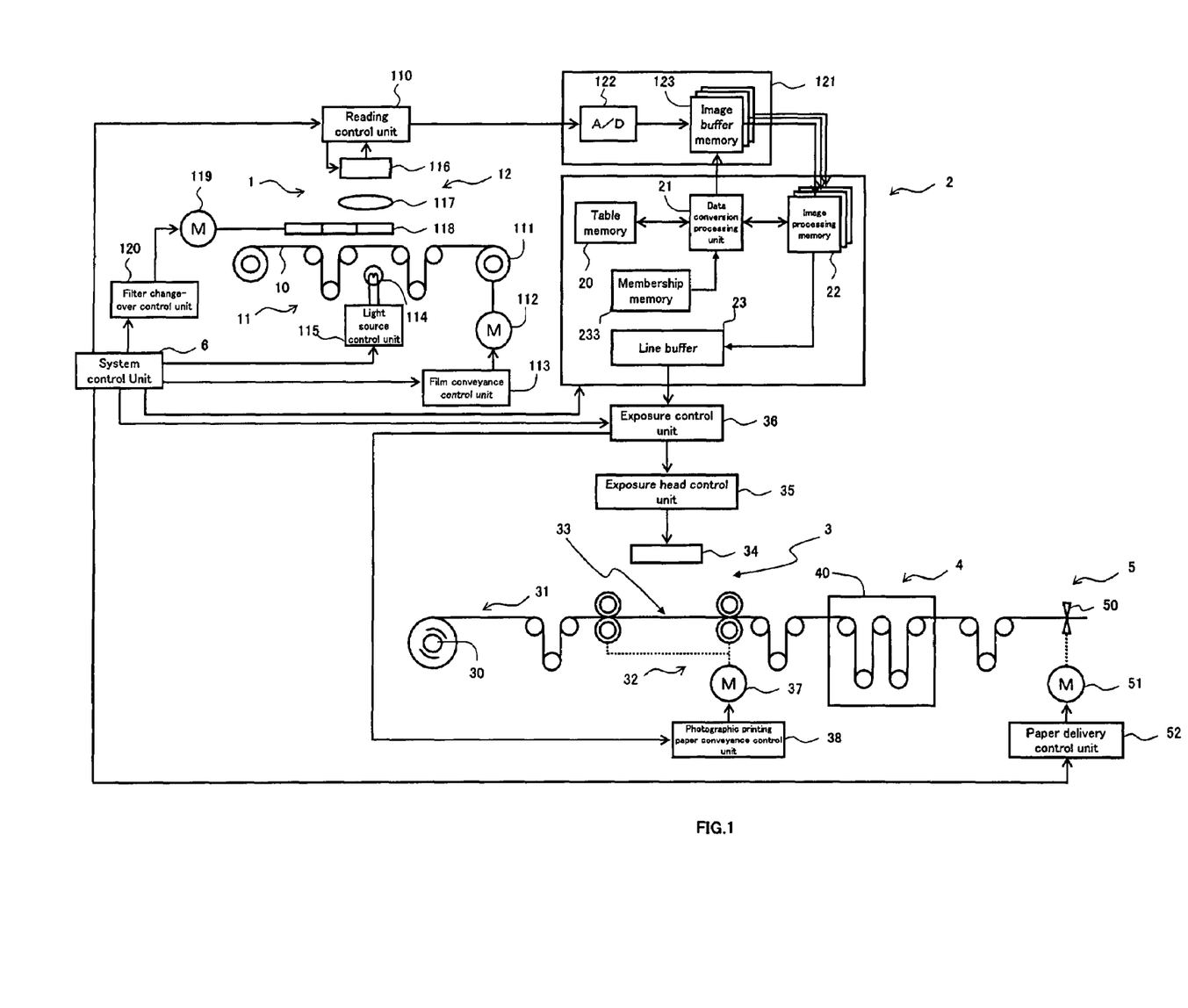
FIG. 1 is a functional block diagram of a photograph image processing device to which a base concentration detecting apparatus according to the present invention is applied.

A device based on the photo image-processing method according to the present invention, as shown in FIG. 1, includes a film image entering unit 1 that reads an image from film and stores in memory, an image data processing unit 2 that provides specified data processing, etc. for the color image data entered from the film image entering unit 1, an image exposing unit 3 that is equipped with an exposure head to expose photographic printing paper in accordance with the processed image data, a developing processing unit 4 that develops the exposed photographic printing paper, a paper delivery unit 5 that cuts the developed photographic printing paper in units of frames, and a system control unit 6 that integrates the whole of functional blocks described above and controls operation.

The film image entering unit 1 includes a film conveying unit 11 that intermittently conveys each frame of developed 135 color negative film 10, for example, and an image reading unit 12 that reads an image of each frame of film 10, and the film conveying unit 11 includes a winding roller 111, film conveying motor 112 that drives to rotate the winding roller 111, and a film conveyance control unit 113 that controls the film conveying motor 112, the image reading unit 12 includes a light source 114 located below the film 10, a light source control unit 115 that controls light-emitting intensity of the light source 114, an image pickup device 116 equipped with two-dimensional CCD, a reading control unit 110 that controls reading of an image by the image pickup device 116, lens 117 that forms each frame-image of film 10 on a light-receiving surface of the image pickup device 116, a optical filter 118 that is installed between the film 10 and the lens 117 and separates the image of film 10 into three colors of RGB, a filter driving motor 119 that changes over and drives the optical filter 118, a filter change-over control unit 120 that drives and controls the filter driving motor 119, and an image data storage memory 121 that stores the image signal read by the image pickup device 116 as digital data. The image data storage unit 121 includes an A/D converter 122 that converts relevant analog image signals of RGB read by the image pickup device 116 into RGB digital image data in a 16-bit gradation level, respectively, and image buffer memory 123 that includes RAM which stores RGB three-color digital image data converted by the A/D converter 122 in units of frames, and others.

The image data processing unit 2 includes table memory 20 that stored table data, etc. used when various correction processing such as color correction and gradation correction, etc. later discussed and the specified processing such as layout processing, etc. are executed for the image data stored in the image buffer memory 123, image data conversion processing unit 21 equipped with an image processing CPU that reads the image data stored in the image buffer memory 123 and executes color correction processing, gradation correction processing, data conversion processing such as magnification conversion processing, etc., image processing memory 22 in which the image data used and converted for conversion processing of image data by the image data conversion processing unit 21 is stored in an area divided according to RGB color components as final image as final image data in the units of frames, line buffer memory 23 that temporarily stores image data of one line of the final image data, and others.

The image exposing unit 3 includes a photographic conveyance unit 32 provided with a photographic printing paper conveyance control unit 38 that conveys a long sheet form photographic printing paper 31 wrapped around a roll cassette 30 towards an exposure station 33 by a conveying motor 37, an exposure head 34 of a PLZT system that exposes and scans the photographic printing paper 31 conveyed to the exposure station 33, an exposure head control unit 35 that drives and controls the exposure head 34, and an exposure control unit 36 that outputs image data from the line buffer memory 23 to the exposure head control unit 35 at a specified timing synchronized with the conveying speed of the photographic printing paper 31.

The developing processing unit 4 includes a processing tank 40 filled with developing processing liquid, such as developing solution, etc., and a conveyance control unit that conveys the exposed roll photographic printing paper 31 to the processing tank 40 and conveys the roll photographic printing paper 31 that has undergone each processing of developing, bleaching, and fixing to the paper delivery unit 5, and the paper delivery unit 5 includes a cutter 50 that cuts the roll photographic printing paper 31 which underwent developing processing at the developing processing unit 4 in the width direction and divides in the units of one frame and a paper delivery control unit 52 that drives and controls a cutting motor 51 that drives the cutter 50 and discharges and controls the cut photographic printing paper 31 to the outside of the device.

The system control unit 6 includes control CPU, ROM in which the control program is stored, RAM for data processing, and control signal I/O circuit for each functional blocks, and each functional block is integrated and controlled by the control program.

The system control unit 6 carries out read control by changing over between two modes: the pre-scan mode in which the film image entering unit 1 is activated to read images of one roll of film including a transparent section at low resolution and at high speed and the full scan mode in which the film image entering unit 1 is activated to read frame-images only of the film recognized in the pre-scan mode at high resolution, and at the same time, activates the image data processing unit 2 to carry out pre-judge processing to calculate and derive correction data for color correction, gradation correction, etc. for the images of low resolution read in the pre-scan mode, and allows color correction and gradation correction to take place on the high-resolution images read in the full scan mode on the basis of the relevant correction data.

Thereafter, the system control unit 6 activates the photographic printing paper conveyance control unit 38 to convey photographic printing paper 31 to the exposure station 33, and activates the exposure control unit 36 to drive and control the exposure head 34 in accordance with the corrected print data which is processed by the image data processing unit 2.

Figure 2:
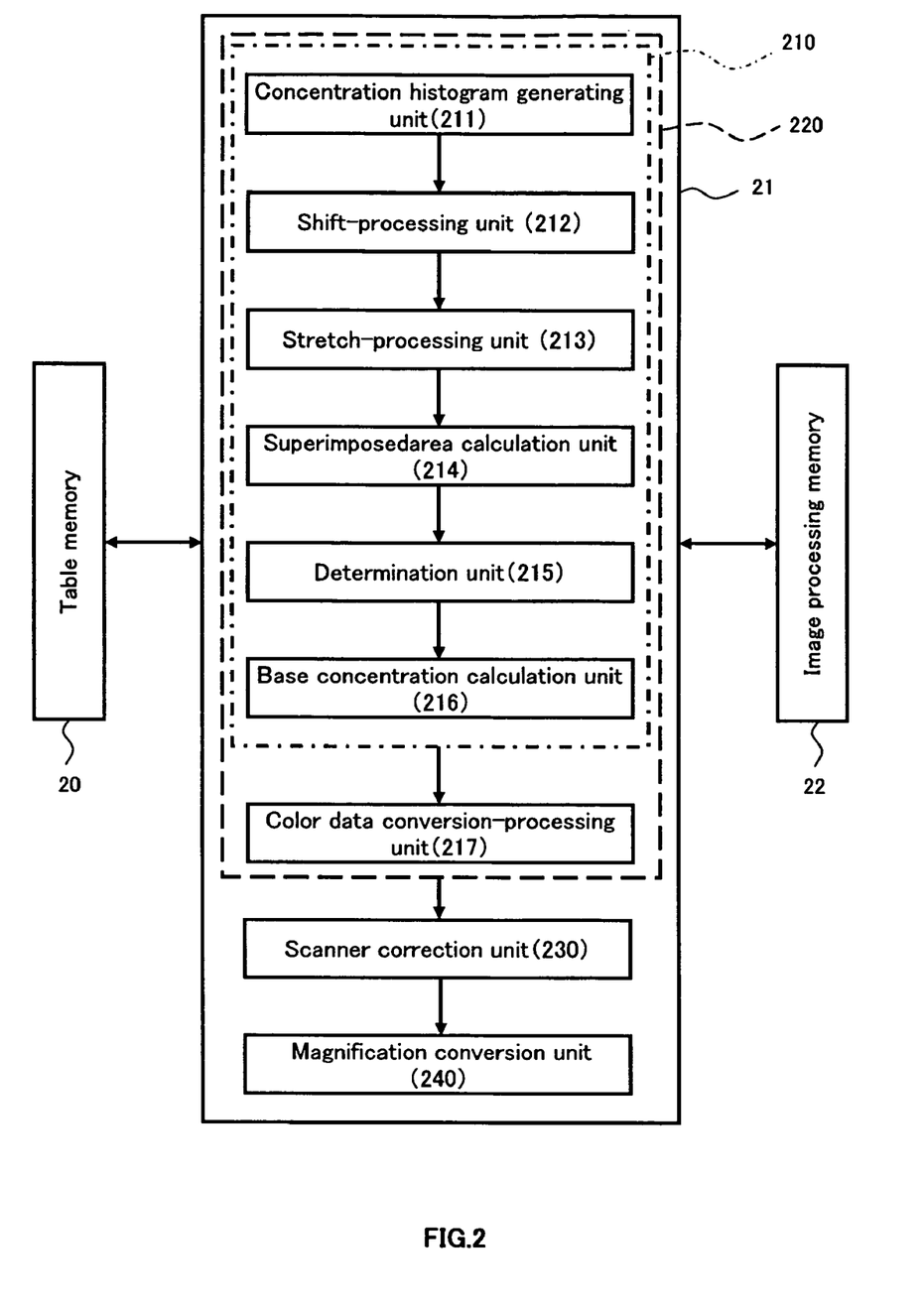
FIG. 2 is a functional block diagram of a photograph image processing unit.

Referring now to FIG. 2, the configuration of main functional blocks of the image data conversion processing unit 21 will be described and at the same time, the processing content will be described in accordance with the flow chart shown in FIG. 3. As shown in FIG. 2, the image data conversion processing unit 21 includes a base concentration detecting unit 210 provided as a base concentration apparatus of the present invention for calculating the base concentration of the film from the color image data at low resolution which has been read out in the pre-scan mode, a color data conversion-processing unit 220 for producing from the base concentration calculated by the base concentration detecting unit 210 a compensating data for the color balance adjustment and compensating the color image data at high resolution read out in the main scan mode with the use of the compensating data, a scanner compensating unit 230 for conducting an action of the concentration adjustment, a magnification power modifier 240 for modifying the film image to match the output side, and other components.

The base concentration detection unit 210 includes a concentration histogram generating unit 211 that generates concentration histograms for each of RGB color components from color image data of the subject film stored in the image data storage unit 121 (FIG. 1), shift processing unit 212 that shifts concentration histograms of other colors in the concentration axial direction, respectively, with the concentration histograms of specific colors used as a reference, stretch processing unit 213 that stretches the concentration histograms of other colors in the concentration axial direction with the minimum concentration value used as reference after shift-processing, superimposed area calculation unit 214 that calculates and derives, respectively, superimposed areas of concentration histograms by combinations of two color components after stretch processing, determination unit 215 that finds the amount of shift and stretch ratio which maximize the total amount of respective superimposed areas calculated, and base concentration calculation unit 216 which finds the base concentration position for each color component in the original concentration histogram based on the amount of shift and stretch ratio with the position that indicates the minimum value in the minimum concentrations of each concentration histogram at the amount of shift and stretch ratio found at the determination unit 215 used as the base concentration position, and which calculates and derives the concentration at the position as the film base concentration value.

The film varies in characteristics in accordance with manufacturers and sensitivities, but in general, there is a certain correlation between RGB color components of color image data, and in particular, the photographed object which contains more achromatic colors provides higher RGB correlation. As the concentration histogram in each of the other color components than a reference color among the RGB color components has been generated from the color image data read out in the film image entering process, it is shifted in the concentration axial direction towards the reference histogram in the color for improving the consistency of the histogram profile between the RGB color components. Then, the histogram of each of the other colors is expanded or compressed in the concentration axial direction depending on the lowest of the concentration value.

After the above stretch processing, the histograms of the concentrations in two color components are examined to calculate their superimposed area. It is then judged that the consistency is maximum when a total of the respective superimposed areas calculated is the greatest. This allows the base concentration of the film to presumably appear at the lowest in the concentration histogram in each color. Accordingly, the base concentration of the film can be calculated through examining the distance of shift rate and the stretch ratio from the original concentration histogram.

Figure 3:
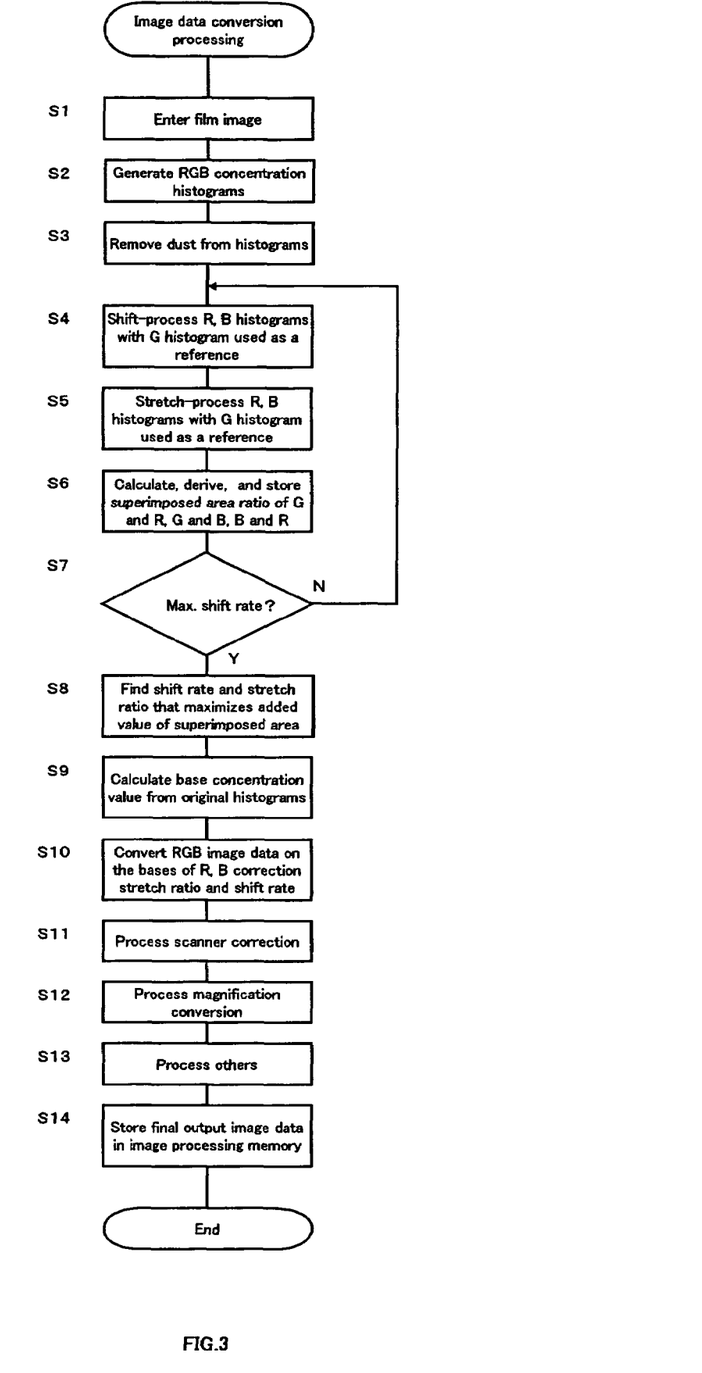
FIG. 3 is a flowchart showing a method of detecting the base concentration of a film.
Figure 4A:
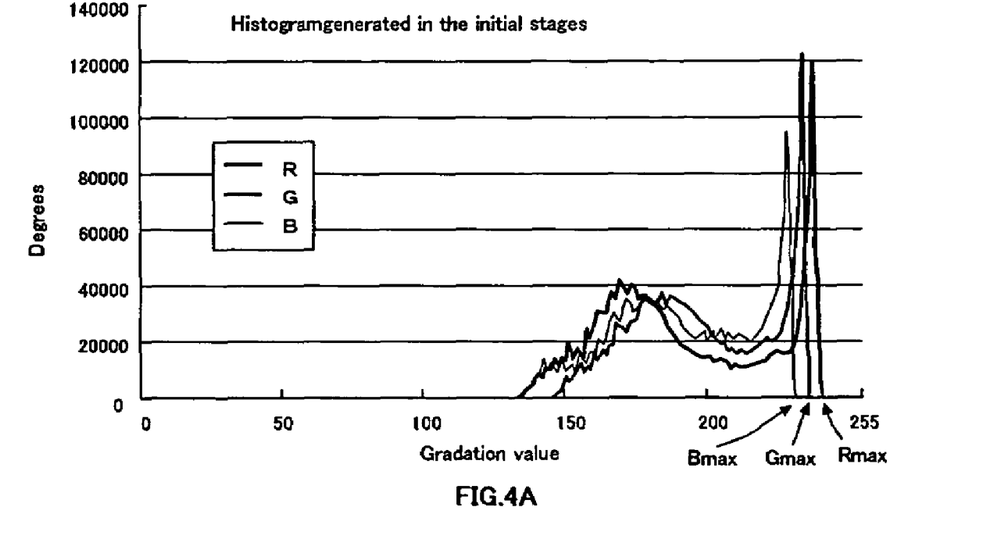
FIG. 4A is a concentration histogram, which indicates each of RGB concentration histograms, respectively, generated on the basis of image data read from film.

As shown in FIG. 3, when the color image data that contains film image equivalent to one roll of 135 color negative film read by the film image entering unit 1 in the pre-scan mode is stored in image buffer memory 123 (S1), concentration histograms of each of RGB color components to the color image data are generated in the table memory 20 area by the concentration histogram generation unit 211 (S2). The concentration histogram is expressed in the two-dimensional coordinate system with the concentration values expressed in 256 stages from 0 (dense) to 255 (thin) as abscissa and the degrees (number of pixels) to the concentration value as ordinate, as shown in FIG. 4A, and the concentration distribution of each of RGB color components of film image equivalent to one roll of 135 color negative film containing a transparent section film can be grasped. By the way, the resolution of abscissa of the concentration histograms shall not be particularly limited and may be suitably set.

Of the degrees that correspond to concentrations of generated concentration histograms, the degrees less than 0.1% of the total number of pixels read are set to 0 in order to eliminate them as noise components (S3). For the relevant concentration RGB histograms with the noise components removed in this way, concentration histograms of other colors are shifted in the concentration axial direction with the concentration histograms of specific colors used as references in such a manner that the conformity of concentration histograms of each color component can be maximized by the shift processing unit 212, and thereafter, concentration histograms of other colors are stretched in the concentration axial direction with the minimum concentration value used as the reference by the stretch processing unit 213.

As described above, the concentration histogram in each of the other colors is shifted along the axis of the concentration towards the reference histogram in the color. However, the length of time required for calculating the base concentration becomes unfavorably increased when the shift rate is infinite. It is then predetermined that the maximum of the shift rate is limited to a deviation of the lowest of the concentration in the histogram in each of the other colors from the minimum of the lowest concentrations in the histograms in the colors. Since the shift towards the minimum is made within the limited range, it contributes to the higher efficiency in the calculation of the base concentration.

Figure 5A:
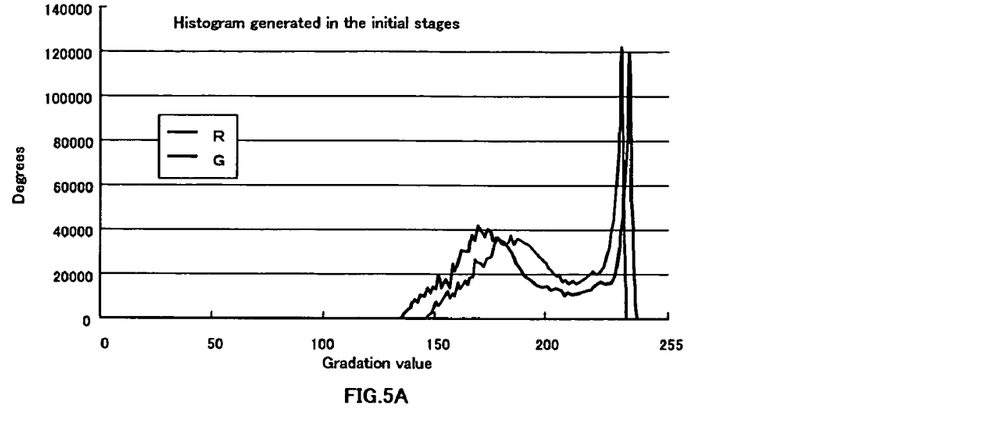
FIG. 5A is a concentration histogram, which indicates each of RG concentration histograms generated on the basis of image data read from film.
Figure 5B:
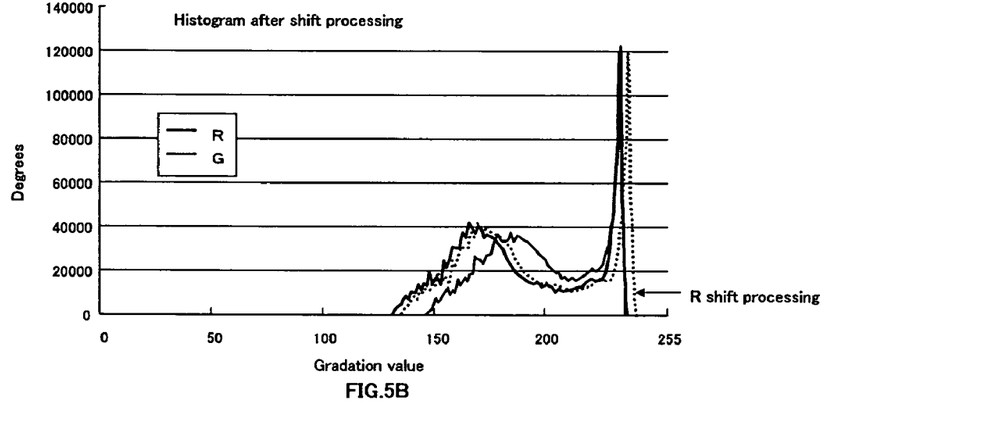
FIG. 5B is a concentration histogram, indicating each of RG concentration histograms, respectively, to explain shift processing.
Figure 6A:
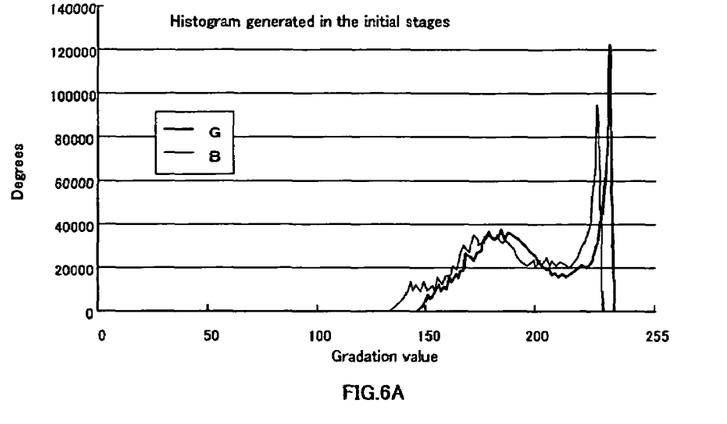
FIG. 6A is a concentration histogram, which indicates each of GB concentration histograms generated on the basis of image data read from film.

Specifically, the shift processing unit 212 shifts the R component concentration histogram (shown with broken line) initially generated with the G component concentration histogram used as a reference as shown in FIG. 5B in the concentration axial direction, in this case, in the gradation axial direction by the specified volume only (shown with solid line) with respect to the G component and R component concentration histograms shown in FIG. 6A. And at the same time, the B component concentration histogram (shown in broken line) initially generated with the G component concentration used as a reference in the concentration axial direction as shown in FIG. 6B, in this case, in the gradation axial direction by the specified volume only (shown in solid line) with respect to the concentration histograms of G component and B component shown in FIG. 6B (S4).

In shift processing, with the deviation of the minimum concentration value of each histogram to the minimum value in the minimum concentration values of concentration histograms of each of color components designated as the maximum shift volume, histograms are shifted to the minimum value. That is, in the case shown in FIG. 4A, histograms are shifted to the minimum value (maximum Rmax of gradations) with the deviations |Rmax-Gmax|, |Rmax-Bmax| with other concentration histograms designated as the maximum shift volume with respect to the minimum value (maximum Rmax of gradations) in the minimum concentration values (maximum concentrations Rmax, Gmax, Bmax) of each concentration histogram of RGB.

For example, when the R component concentration histogram is shifted with the G component concentration histogram used as a reference, the histogram is shifted only by the initial value preset with the maximum value Rmax of R gradation set as a reference (−10 scale (this value is not particularly restricted but is properly set)), and thereafter, the histogram is shifted in the direction where the gradation is increased in increments of 1 scale to the scale that corresponds to the maximum shift volume (|Rmax-Gmax|). In the similar manner, when the B component concentration histogram is shift-processed, the histogram is shifted only by the initial value (−10 scale) preset with the maximum value Bmax of B component gradation used as a reference, and thereafter, the histogram is shifted in the direction where the gradation is increased in increments of 1 scale to the scale that corresponds to the maximum shift volume (|Rmax-Bmax|).

Figure 5C:
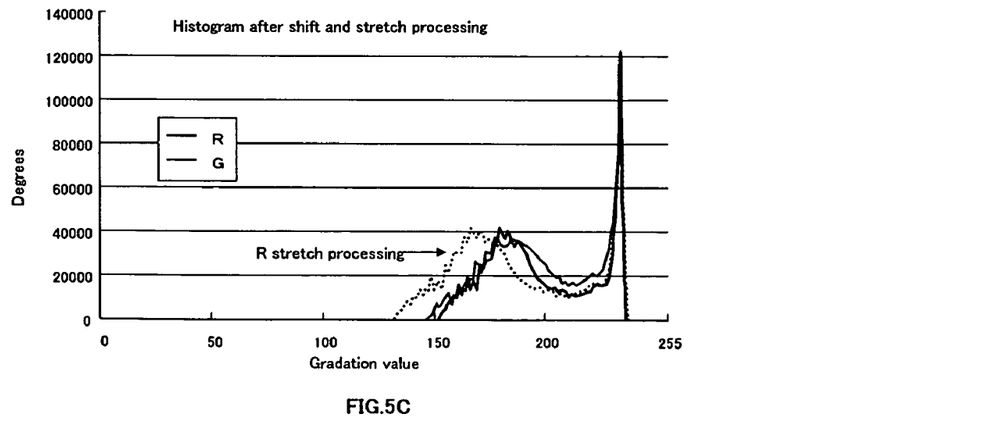
FIG. 5C is a concentration histogram, indicating each of RG concentration histograms, respectively, to explain stretch processing.
Figure 6B:
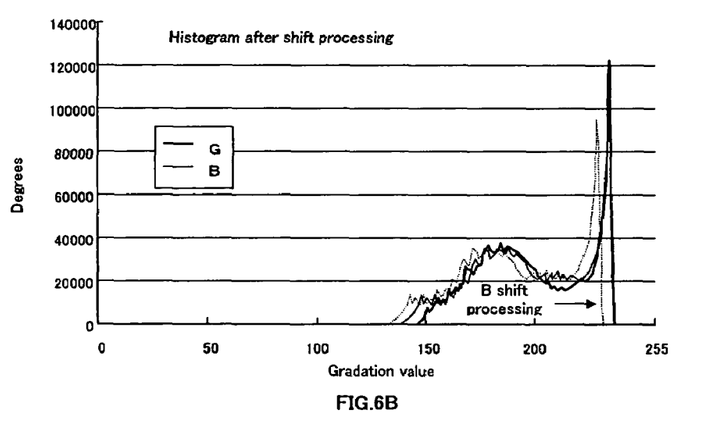
FIG. 6B is a concentration histogram, indicating each of GB concentration histograms, respectively, to explain shift processing.
Figure 6C:
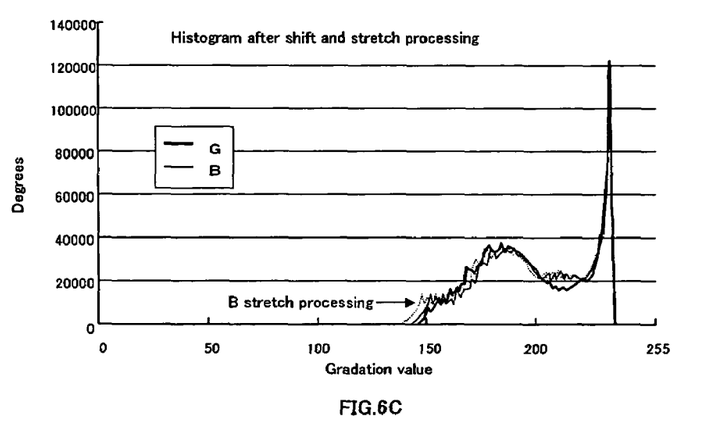
FIG. 6C is a concentration histogram, indicating each of GB concentration histograms, respectively, to explain stretch processing.
Figure 7A:
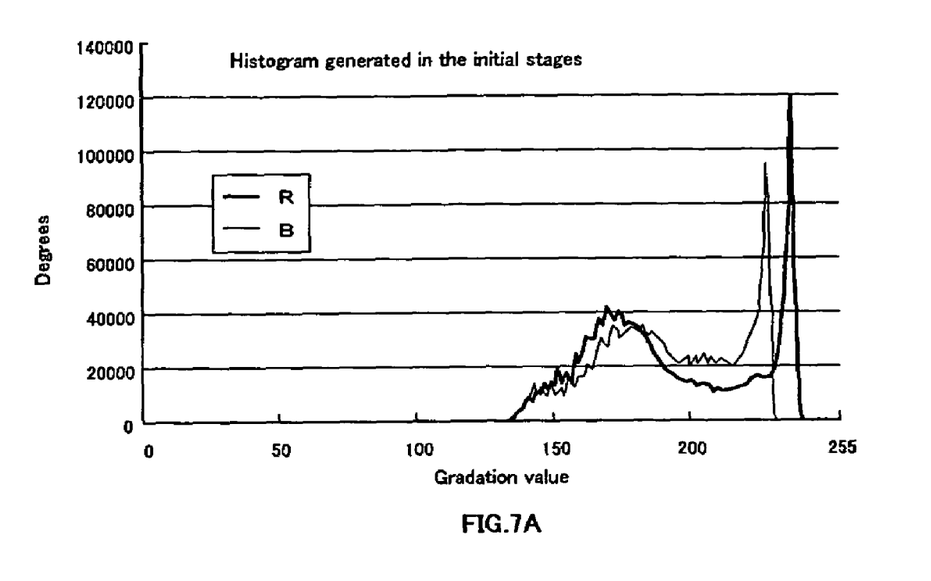
FIG. 7A is a concentration histogram, which is a histogram of each of RB concentrations generated on the basis of image data read from a film.
Figure 7B:
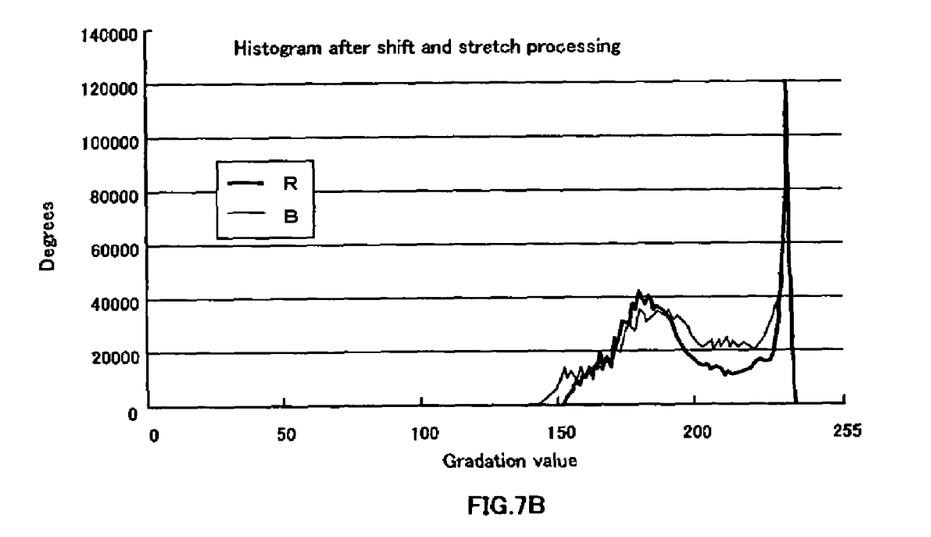
FIG. 7B is a concentration histogram, which is a histogram of each of RB concentrations after shift-processing and stretch-processing of FIG. 5B and FIG. 5C as well as FIG. 6B and FIG. 6C.

After shift-processing, the stretch processing unit 213 carries out stretch processing stepwise so that the position that indicates the minimum concentration of R component concentration histogram and B component concentration histogram, respectively, that is, the left end of the R component concentration histogram of FIG. 5B and the left end of the B component concentration histogram of FIG. 6B are located at each scale in the range of ±15 scale from the relevant positions (this value is not particularly restricted, either, and may be properly set) (S5). One example of concentration histograms of each component is shown in FIG. 5C, FIG. 6C, and FIG. 7B. By the way, FIG. 7A shows concentration histograms of R component and B component initially generated.

The superimposed area calculation unit 214 calculates and derives the superimposed area of respective concentration histograms by combinations of two color components after processing of Steps S4 and S5 described above, that is, the area of superimposed portion of G and R, G and B, B and R concentration histograms (S6).

Figure 4B:
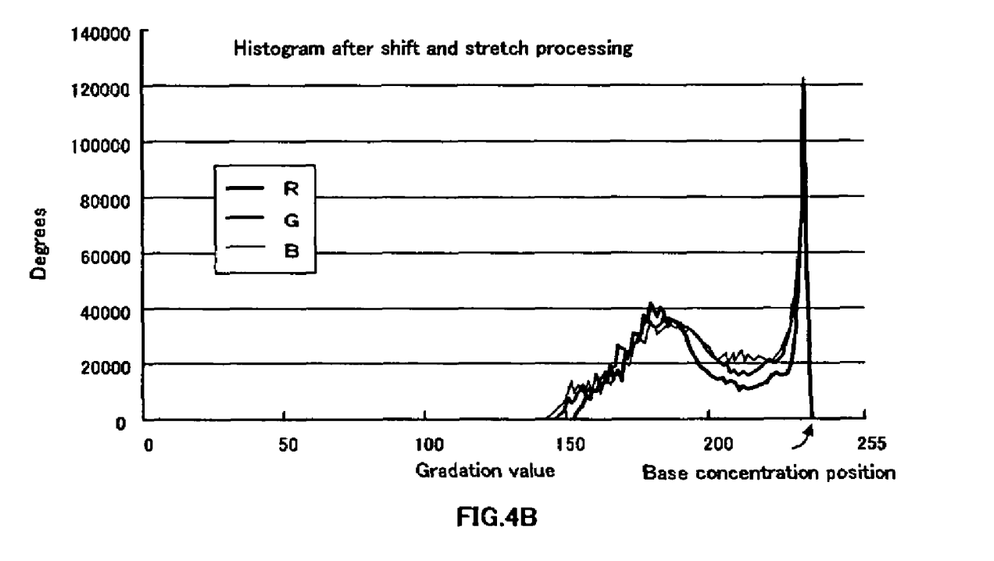
FIG. 4B is a concentration histogram, which indicates each of RGB concentration histograms, respectively, after shift-processing and stretch-processing.

The processing from step S4 to step S6 is repeated and the determination unit 215 repeats processing to find out the G and R, G and B, B and R superimposed area of concentration histograms every time processing from step S4 to step S6 is repeated (S7), and finds the shift rate and the stretch ratio that maximizes the relevant superimposed area (S8). FIG. 4B shows histograms of each color component after shift processing and stretch processing when the superimposed area is maximized. The base concentration calculation unit 216 recognizes the maximum value (minimum value) of the maximum gradation (minimum concentration) of each histogram in such event, and calculates back to find the base concentration position for each of the color components in the original concentration histograms shown in FIG. 4A in accordance with the relevant shift rate and stretch ratio, and calculates and derives the concentration at the position as the film base concentration value (S9).

The color data conversion processing unit 220 stores the shift rate and the stretch ratio found at the discriminating unit 215 with the determined base concentration of the relevant film used as reference as correction data for color balance adjustment and correction-processes the high-resolution color image data read by the full scan mode (S10). That is, the color data conversion processing unit 220 conversion-processes the RGB components of each of relevant pixels of high-resolution frame-image data stored in the image buffer memory 123 at the time of full scan. For example, in the event that the shift rate of R component is found as Sr and the stretch ratio as Mr as the correction data, the color data conversion processing unit 220 shifts the R component of high-resolution frame-image data by Sr and then, multiplies by Mr to calculate and derive new R component pixel data.

This concludes color correction processing and scanner correction processing (S11), magnification conversion processing (S12), and other necessary processing (S13) are successively executed, and the final output image data is stored in image processing memory 22 (S14).

That is, as shown in the flow chart of FIG. 3, a method for detecting the base concentration of a film according to the present invention includes a film image entering process for reading a film image by an image pickup device and generating color image data, a concentration histogram generating process for generating concentration histograms for each of RGB color components from the color image data, a shift processing process for shifting concentration histograms of other colors in the concentration axial direction, respectively, with a concentration histogram of a specific color used as a reference, a stretch-processing process for stretching the concentration histograms of other colors in the concentration axial direction with the minimum concentration value used as a reference after shift processing, a superimposed area calculating process for calculating superimposed area of the concentration histogram, respectively, by combinations of two color components after stretch-processing. a discriminating process for finding a shift rate and stretch ratio which maximizes either the total of respective superimposed areas calculated or respective superimposed areas, and a base concentration calculating process of specifying the location of a base concentration from the minimum of the lowest concentration in the histograms at the shift rate and the stretch ratio determined in the discriminating process, determining the location of the base concentration of each color in the histogram from the shift rate and the stretch ratio, and calculating the base concentration value in each component of the film from the location of the base concentration.

In the above-mentioned embodiment, description is made on an example to find the shift rate and the stretch ratio of R, B components with the G component used as a reference, but this may be configured to find the shift rate and the stretch ratio with the R component or B component used as a reference.

In the above-mentioned embodiment, discussion is made on the case in which the base concentration detection unit 210 detects the base concentration with respect to the low-resolution color image data containing a transparent section read by the film image entering unit 1 in the pre-scan mode, but needless to say, it is possible to detect, in the same manner, the base concentration for the high-resolution color image data containing frame-images alone read by the film image entering unit 1 in the full scan mode.

The photographic image processing apparatus equipped with the base concentration detecting apparatus of the present invention may be not only of a digital exposure type but also of a projection exposure type.

The present invention should not be limited to the above-mentioned embodiments but changes and variations may be made properly within the purview of characteristic configurations set forth in the column of "Problems that this invention is to solve" and their combinations as far as the similar working effects are obtained.

What is claimed is:

1. A method of detecting a base concentration of a film, comprising:
   a film image entering process for reading a film image by an image pickup device and generating color image data;
   a concentration histogram generating process for generating concentration histograms for each of RGB color components from the color image data;
   a shift processing process for shifting concentration histograms of other colors in a concentration axial direction, respectively, with a concentration histogram of a specific color used as a reference;
   a stretch-processing process for stretching the concentration histograms of the other colors in the concentration axial direction with a minimum concentration value used as a reference after shift processing;
   a superimposed area calculating process for calculating superimposed area of the concentration histogram, respectively, by combinations of two color components after stretch-processing;
   a discriminating process for finding a shift rate and a stretch ratio when a total of the respective superimposed areas calculated in said superimposed area calculating process is the greatest value by repeating said shift processing process, said stretch-processing process and said superimposed area calculating process;
   a base concentration calculating process for specifying a location of a base concentration from the minimum of the lowest concentration in the concentration histograms at the shift rate and the stretch ratio determined in said discriminating process, determining the location of the base concentration of each color component in the original histogram corresponding to the location of the base concentration from the shift rate and the stretch ratio, and calculating the base concentration value in each component of the film from the location of the base concentration;
   a correction-processing process for correcting RGB components of each relevant pixel of the color image data with the base concentration value calculated in said base concentration calculating process; and
   an output process for exposing photographic printing paper with an exposure head in accordance with the color image data corrected in said correction-processing process and outputting a photo-print.

2. The method of detecting the base concentration of a film according to claim 1, wherein said shift processing process is arranged to have the maximum of the shift rate limited to a deviation of the lowest of the concentration value in the histogram in each color component from the minimum of the lowest concentrations in the histograms in the color components and shift the histogram of each color towards the minimum value.

3. An apparatus for detecting the base concentration of a film, comprising:
   a film image entering unit for entering a film image by reading a film image by an image pickup device and generating color image data;
   a concentration histogram generating unit for generating concentration histograms for each RGB color component from the color image data;
   a shift processing unit for shifting concentration histograms of other colors in a concentration axial direction, respectively, with a concentration histogram of a specific color used as a reference;
   a stretch-processing unit for stretching the concentration histograms of the other colors in a concentration axial direction with a minimum concentration value used as a reference after shift processing;
   a superimposed area calculating unit for calculating superimposed area, respectively, by combinations of two color components after stretch-processing;
   a discriminating unit for finding a shift rate and a stretch ratio when a total of the respective superimposed areas calculated by said superimposed area calculating unit is the greatest value by repeating processes performed by said shift processing unit, said stretch-processing unit and said superimposed area calculating unit; and
   a base concentration calculating unit for specifying a location of a base concentration from the minimum of the lowest concentration in the concentration histograms at the shift rate and the stretch ratio determined by said discriminating unit, determining the location of the base concentration of each color component in the original histogram corresponding to the location of the base concentration from the shift rate and the stretch ratio, and calculating the base concentration value in each component of the film from the location of the base concentration;
   a correction-processing unit for correcting RGB components of each relevant pixel of the color image data with the base concentration value calculated by said base concentration calculating unit; and
   an output unit for exposing photographic printing paper with an exposure head in accordance with the color image data corrected by said correction-processing unit and outputting a photo-print.

4. The apparatus for detecting the base concentration of a film according to claim 3, wherein said shifting processing unit is arranged to have the maximum of the shift rate limited to a deviation of the lowest of the concentration in the histogram of each color component from the minimum of the lowest concentrations in the histograms in the color components.

* * * * *